United States Patent [19]

McVay et al.

[11] Patent Number: 4,872,939

[45] Date of Patent: Oct. 10, 1989

[54] APPARATUS FOR ASSEMBLING LINED PACKAGING TRAY

[75] Inventors: David R. McVay; Lawrence D. Carter, both of Hazlehurst, Ga.; John D. Jonasky, Fresno, Calif.; Chris A. Jefferson, Hazlehurst, Ga.

[73] Assignee: Amoco Corporation, Chicago, Ill.

[21] Appl. No.: 41,390

[22] Filed: Apr. 23, 1987

[51] Int. Cl.[4] .................. B65H 3/08; B65G 59/10
[52] U.S. Cl. .................... 156/354; 156/353; 221/222; 198/408; 198/532; 198/625; 242/55.3; 242/58
[58] Field of Search ............... 414/93, 94; 221/222; 198/408, 532, 624, 625; 242/58, 55.3; 156/353, 354, 521

[56]  References Cited
U.S. PATENT DOCUMENTS 3,843,253 10/1974 Mikan et al. ............... 242/55.3 X
4,165,388  8/1979 Hedge et al. ............... 242/55.3 X
4,552,315 11/1985 Granger ..................... 242/55.3

Primary Examiner—Michael W. Ball
Assistant Examiner—Jeff H. Aftergut
Attorney, Agent, or Firm—Maria P. Tungol; William H. Magidson; Ralph C. Medhurst

[57] ABSTRACT

In an apparatus for preparing absorbent pad lined packaging trays, means sense the tail end of a liner supply that is to be discarded, determines and cuts off the length thereof, withdraws the cut off length from the line of machine operation and feeds into such line the lead position of a fresh liner supply. Other means denest a supply of flanged trays to be pad lined by at least two denesters that comprise synchronized, vertically oriented rotary bodies that during parts of a single rotation each have a bottom laterally extending plate that supports the bottom-most tray of a stack, an upper laterally extending plate that supports at tray flanges the next in line tray to be denested an a laterally extending, vertically inclined cam plate that is adapted to ride on the upper flange surface of a tray that is in the process of being denested to thereby forcibly eject same.

6 Claims, 4 Drawing Sheets

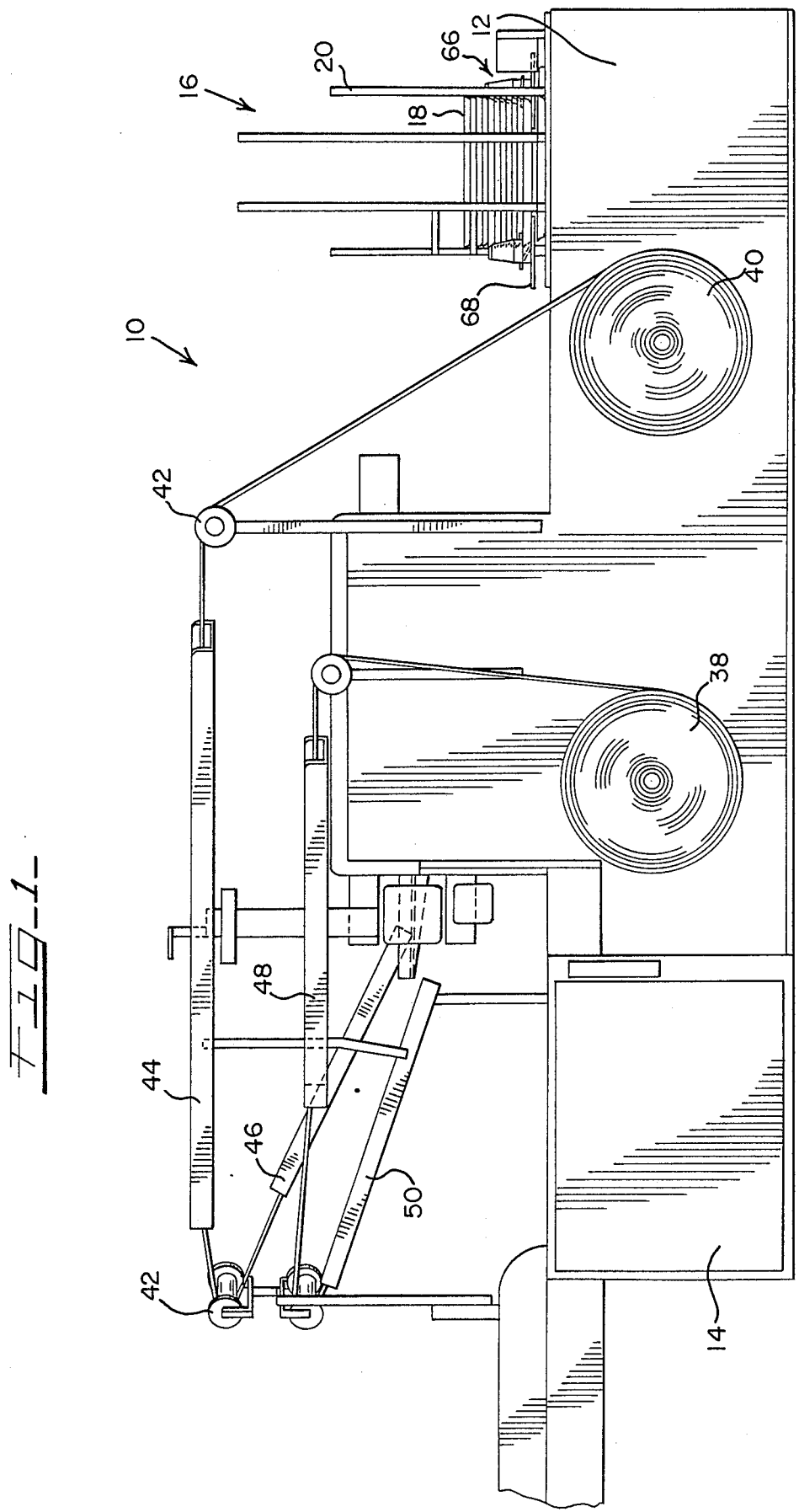

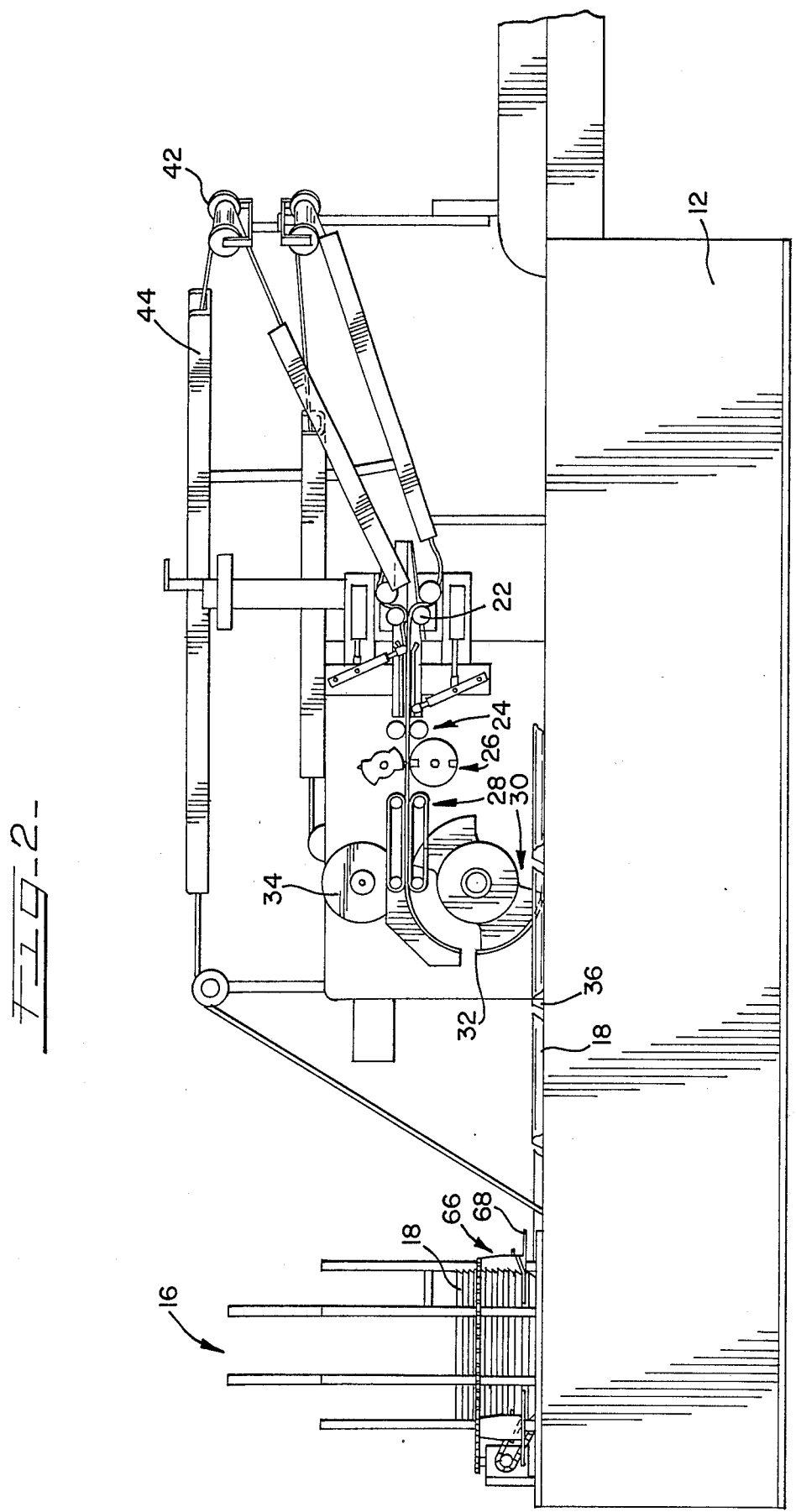

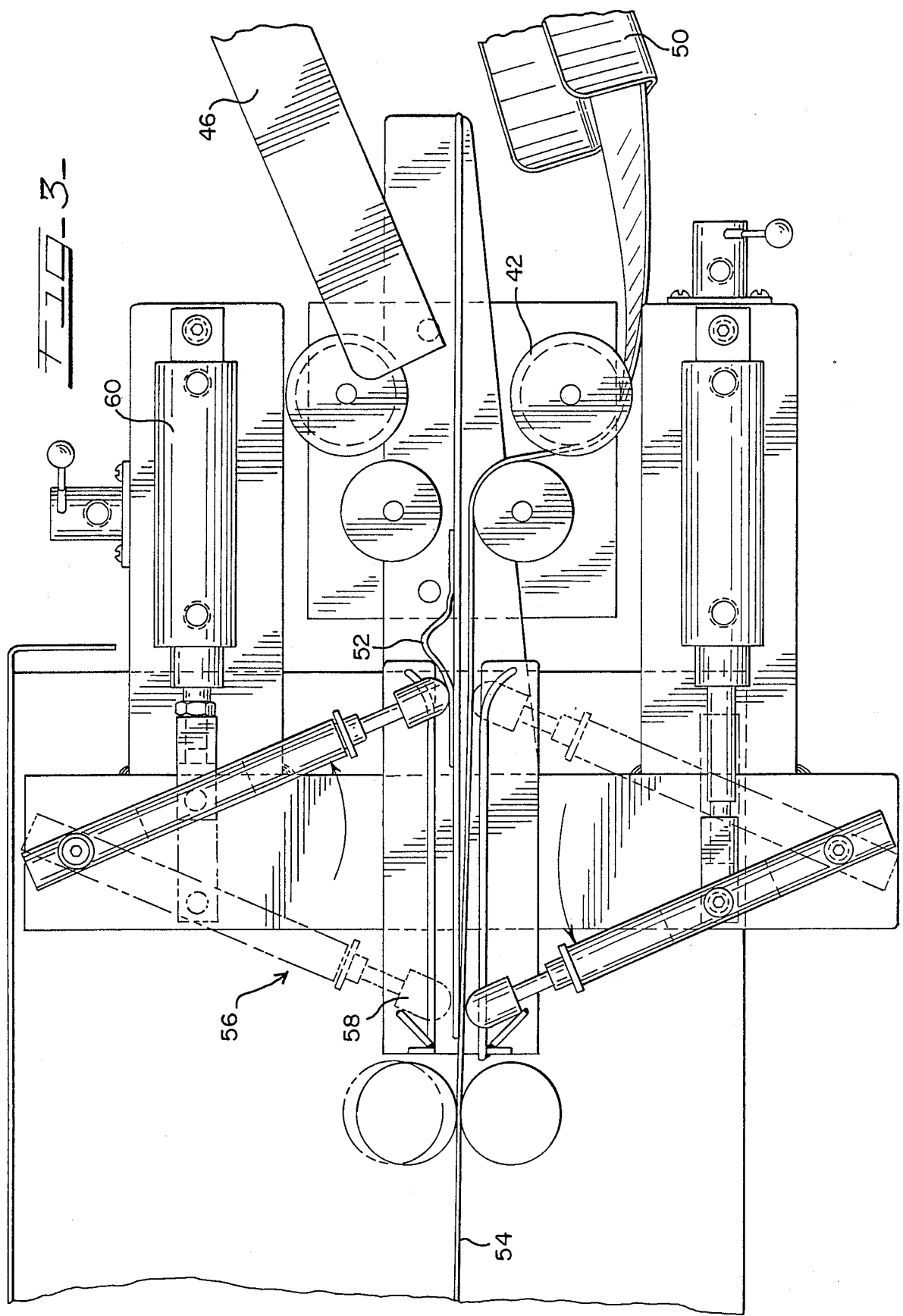

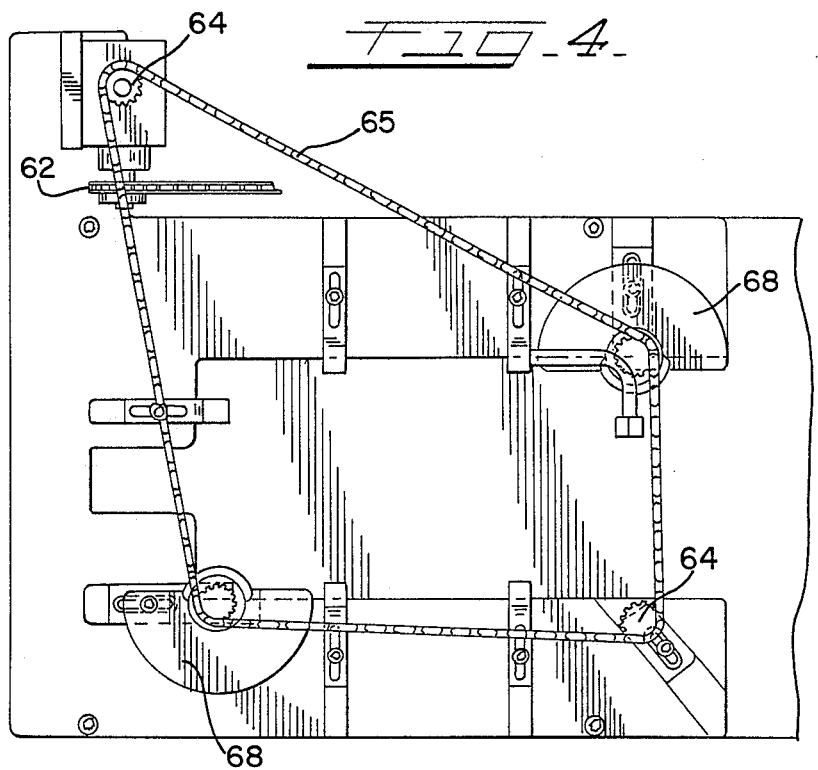
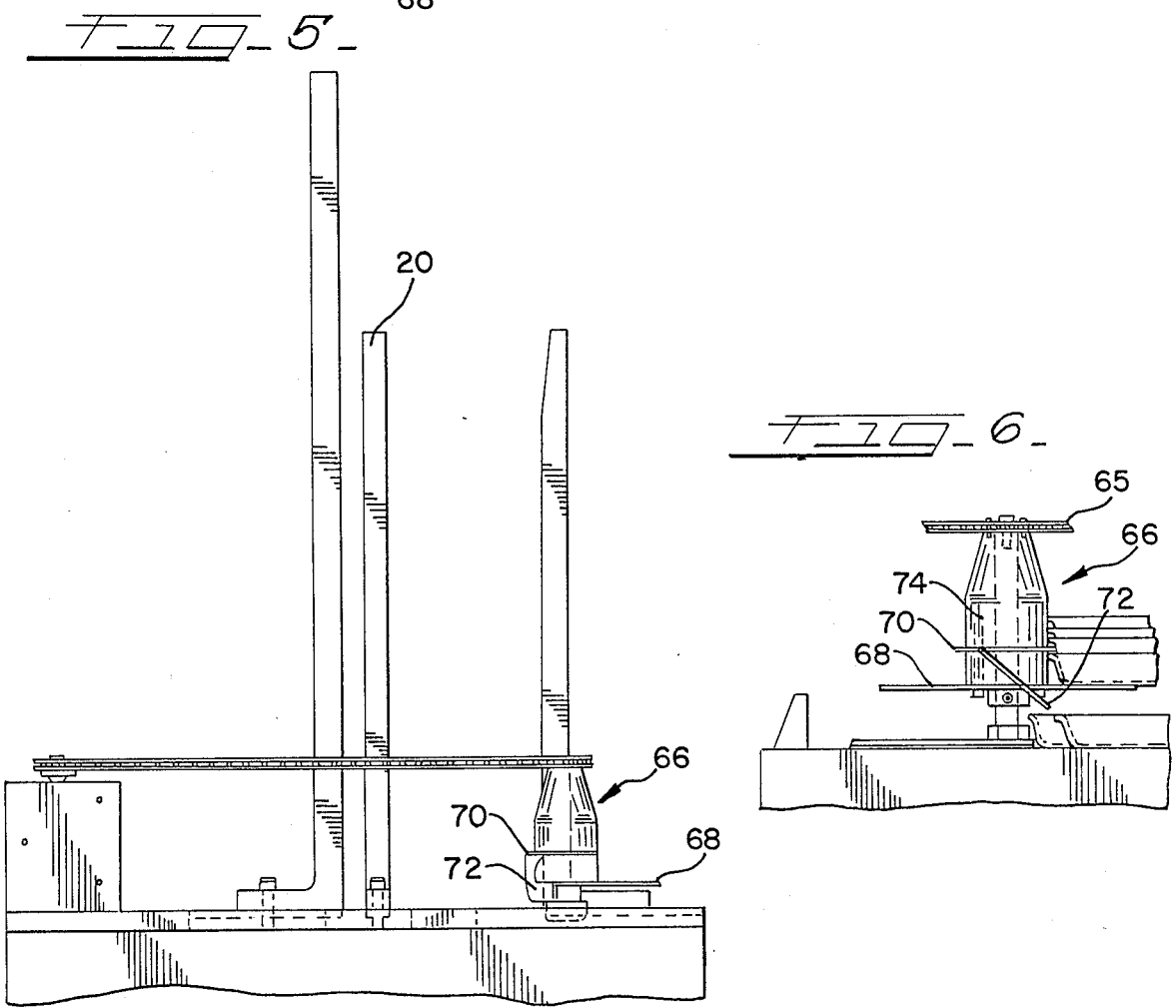

4,872,939

APPARATUS FOR ASSEMBLING LINED PACKAGING TRAY

TECHNICAL FIELD

The present invention relates to an improved and novel apparatus for preparing packaging trays wherein means denest trays at a magazine supply thereof and sequentially prepare and assembly absorbent liner pads therein.

BACKGROUND OF THE INVENTION

In the art of providing packaging trayps, it is known to utilize a machine that has means to (1) denest trays seriatim from a magazine stack and feed the separated trays spacedly onto a horizontal flight of an endless conveyor; (2) feed an absorbent pad liner material from a roll supply and through a perforating station to at least perforate the top surface of the material whereby fluids exuded from and associated with the products to be packaged may pass through said top surface whereby to inhibit bacterial spoilage and to present a package that is more palatable to the gustatory senses; (3) cut liner lengths from said perforated material; (4) apply adhesive to the underside of each liner; (5) deposit the coated liner into adhering contact with an associated tray on the conveyor; and (6) finally transfer the lined trays to a further conveyor for subsequent handling.

Such a known apparatus system is disclosed in the commonly owned U.S. Pat. No. 4,260,311 of Mark J. Hanses, issued Apr. 7, 1981, the disclosure of which is incorporated by reference into the instant application for patent.

Such known apparatus system of Hanses, and related known systems, have a common disadvantage in that they present an undue sophistication and multiplication of mechanical parts and movements. Hence, as is predictable, machine costs, downtime costs, and setting maintenance are hardly conducive to economic efficiency, especially so in a high production system and even more especially so where the system may be tied into a food packaging operation.

Further, these machines, because of the aforegoing disadvantages and because at best, as in the Hanses patent structure, they rely upon a screw helix for denesting purposes, they cannot attain an operating speed that truly qualifies as a high production system, as for instance a high production assembly system that could keep pace with the tray output of a modern high production thermoformer.

SUMMARY OF THE INVENTION

The present invention is directed to an improved and novel apparatus for assembling a lined packaging tray and especially such apparatus for assembling an adhesively coated, absorbent, perforated liner into a tray wherein apparatus means to denest and feed trays, produce and assemble the liner with the tray and to thereafter transfer and renest the trays for further handling.

It is an object of the invention that the novel and improved apparatus be comprised of relatively fewer mechanical parts and relatively simpler mechanical movements whereby to effect dependability of operation, lower machine costs, lesser downtime and simplified and improved duration of mechanical settings.

A further object of the invention is the novel association and location of subassemblies of the machine whereby to facilitate the handling of parts and the recharging of massive rolls of materials to be processed.

Another object of the invention is to provide a novel camming and support mechanism for denesting trays whereby to effect a significantly higher volume of machine output.

Another object of the invention is to provide novel means that sense the terminal portion of a roll of liner material; determine the minimal amount of such material to be discarded; cut off such material to be discarded; remove the cut off terminal portion from the machine's line of operation; and finally feed into the machine's line of operation the lead section of the next roll of liner material to be utilized.

For a more fully developed presentation of the invention, and a preferred embodiment thereof, reference is made to the following descriptive matter, attached drawings and claims.

BRIEF DESCRIPTION OF THE DRAWINGS

FIG. 1 is an elevational side view of the rear of the machine and shows the tray magazine on the right, the right side liner supply roll which is on operation and the left side liner supply roll which is on standby.

FIG. 2 is an elevational side view of the front of the machine.

FIG. 3 is an elevational partial side view of the machine and illustrates operation of the extractor-infeed arms wherein the upper arm shows removal of a terminal liner portion and the lower arm shows the pivotal movement for infeed of a lead from a new liner supply.

FIG. 4 is a upper plan view showing the chain drive for a pair of catty-cornered denester members.

FIG. 5 is an elevational view of the tray magazine and one of the denester members.

FIG. 6 is an elevational view of one of the denester members in operative association with the trays.

DETAILED DESCRIPTION OF THE INVENTION

Referring to the drawings which show a preferred embodiment of the invention, and wherein like materials indicate like structure, there is shown in FIG. 1 the back side elevational view of the apparatus 10 having a box-like housing 12 whose bottom deck may comprise a wheeled dolly, as in the commonly owned U.S. Pat. No. 4,260,311 to Mark J. Hanses that is incorporated herein by reference, and has access means 14 that is illustrative of any number of conveniently located entry means to the housing interior and the mechanism therein.

Very similar to, or identical to, the Hanses patent structure, FIGS. 1 and 2 show a magazine 16 for supplying flanged trays 18 to be processed; magazine guide bars 20 that are adjustable with respect to the dimensions of the trays to be processed; liner material feed rolls 22, 24; the latter including perforating pins for piercing at least the top film layer of the composite absorbent liner; adjustable rotary anvil and cutter means 26 for cutting pad sized lengths from the liner web; pad feed belt means 28; two-lobed pad vacuum-transfer and airpressure release rotor 30 for transfer of pad lengths 32 from belt means 28, past wiping contact with adhesive applicator roll 34 and to release seriatim into spaced trays being conveyed by pusher lugs 36 of an endless conveyor chain that conveys the packaging trays (i.e., trays with liner pads therein) to transfer and renester means as for instance disclosed in FIGS. 25, 26, 27, 28 of the identified patent to Hanses. Invention is not claimed in any of, or any combination of, said very similar or identical structure to that of patentee Hanses, whose disclosure clearly sets forth all details of such structure and whose disclosure has been incorporated herein by reference.

Referring now to FIGS. 1, 2 and 3, is shown one aspect of the invention. Unlike prior apparatus systems, as for instance that of Hanses, wherein liner supply rolls are mounted at an upper most level of the machine, applicant mounts his supply rolls 38, 40 alongside of the machine and as shown at a low level whereby handling of these heavy and massive supplies require much less effort and sophisticated lifting and handling means and time expended in removal of an emptied spool and replacement by a liner supply roll thereat. The mounting means for such liner supply rolls are not shown in order not to obscure the inventive concepts and because such mounting means per se are well within the purview of any able mechanic in the art. As shown, the leads from the supply rolls are accommodated in separate systems of similar guide rolls 42 and guide channels 44, 46, 48, 50.

Referring especially to FIG. 3 is shown the novel arrangement for retracting for discard a cut off terminal portion 52 of a liner from an emptied supply roll and inserting the lead portion 54 of the fresh liner supply. Thus, is shown an upper pivotal arm 56 that comprises an air cylinder body having a reciprocable head 58. The head has an arcuately configured end face of any desired finish characteristic for non-marring, frictional contact with the liner material to be handled. Air cylinder 60 provides motive power for carrying the arm through its pivotal motion. Identical, bottom located air cylinder and reciprocable head means are disclosed.

In operation, an electric eye, as is old and well known in the arts of feeding sheets and indeterminant lengths, is utilized to detect the terminal portion of a liner supply roll. Such terminal portion will be marred and possibly will include an odd length with respect to a pad length and hence is preferably discarded. Electrical circuitry in conjunction with the electric eye detection of such terminal portion results in a signal that initiates the following: a counter determines when the last desired cut of the liner web occurs; the pivotal arms's cylinder urges the arcuate head surface into contact with said cut off portion 52, as shown in broken lines in FIG. 3; air cylinder 60 operates to retract the pivotal arm and hence withdraw the terminal liner portion (see full line showing of the upper pivotal arm in FIG. 3); the head is released from contact position; continuing the sequence of operation initiated and illustrated by FIG. 3, the lower pivotal arm's air cylinder urges the arcuate head surface into frictional contact with the lead of a new liner supply (the lower arm being now disposed as shown in broken line); the associated lower air cylinder 60 then moves the pivotal arm to its full line position whereby to feed said lead portion into the machine's line of operation; and the head is retracted.

On detection of the next terminal portion, and for introduction of a subsequent liner supply lead, the sequence of pivotal arm movements would be reversed.

The electrical circuitry to effect the described operation for withdrawal of a terminal liner section and insertion of a new supply lead is not shown; since no novelty is claimed in the circuitry per se, it is desirable not to obscure the inventive concepts, and because once being apprised of the novel structure and movements thereof, any good mechanic in the art could devise the required circuitry without rising to a moment of invention.

Reference is made to FIGS. 1, 2 and especially FIGS. 4, 5, 6 for illustration of a second aspect of the invention wherein novel means for denesting trays is disclosed. Drive chain 62, driven off a master drive as for instance in the patentee Hanses apparatus, drives a series of sprocket means 64 and adjustable tensioned drive chain 65 to effect rotary movement of a pair of rotary denester means 66 that, as shown in FIGS. 1 and 2, are located catty-corner with respect to the magazine stacked trays. The driven sprockets and denester means are adjustably mounted, as is clearly shown in FIG. 4; novelty is not claimed with respect to such adjustable mountings. What is novel is that in the instant structure a simple, easily acessible, drive chain arrangement replaces the multitude of geared drive means as in prior structures, as for instance in the patentee Hanses structure. Further, the simplified drive chain arrangement allows for speeded-up machine operation and simplified mechanical settings.

The denester members 66 replace the known relatively slow-acting helical screw type of denester, as for instance that disclosed in the Hanses patent. Each denester member is disposed on a vertical axis and comprises a horizontally oriented lower support plate 68 that extends peripherally approximately 190° about the denester member axis and whose angular peripheral ends connect generally in a chord configuration. Each plate is vertically located and is of a radial length to such angular periphery so to underlie and support the bottom-most of the trays that are stacked in the magazine.

Spaced from such lower plate member is a horizontally oriented upper plate member 70 whose effective periphery is generally diametrically opposite to said peripheral structure of the lower plate (see FIGS. 4 and 5) extends perpherally approximately 150° about said denester member axis and is vertically located and of a radial length to such periphery so as to underlie and support an associated peripheral flange of a stacked tray succeeding that bottom-most tray being denested.

Starting at about the height of the lower surface of the upper plate 70 (see FIG. 5) is a planar inclined cam member 72 that extends laterally outwardly of the vertically oriented body portion 74 of the denester and extends downwardly at an angle of approximately 40° to such upper plate. The cam member 74 extends to below, and is clear of, the lower plate member 68 and extends laterally outwardly of said denester body so as to engage with the upper flange surface of a tray in the process of being denested.

Referring to FIGS. 4, 5, 6, the sequence of denesting is as follows:

(a) at initiation of such sequence, the catty-cornered lower plates 68 are positioned so as to support the lowermost stacked tray;

(b) on clockwise rotation of the denester means 66, the lowermost plates pass out from such support position while the upper plates 70 pass into support positions at the flanges of the next succeeding tray and the lead edges (i.e., the upper end) of the inclined cam plates 72 engage the upper surface of the tray being denested to thereby impart a positive force for downward motion of said denesting tray;

(c) continued rotation of the denester maintains the tray support relationship of the upper plates 70, while the inclined cam plates complete the tray discharge function with loss of tray contact at the lowermost end of the inclined plates; and (d) at such latter point of denesting operation, the lower plates 68 have rotated to support position of the then lowermost tray and the upper plates and inclined cam plates have been rotated to nonfunctional positions.

To facilitate tray discharge, a vacuum is established below the receiving area on the conveyor whereon the trays are to be spaced.

The applicant has set forth a positive, fast-acting denester means in place of the passive, relatively slow-acting helical guide of prior art denesters.

The embodiment shown and described is only illustrative of the present invention and is not to be construed as being delimitive therefor; since once being apprised of the invention, changes in structure would be readily apparent to one skilled in the art. Hence, the present invention includes all modifications encompassed within the spirit and scope of the following claims.

We claim:

1. In an apparatus for preparing a pad-lined packaging tray, having means for denesting flanged trays that are horizontally oriented in a vertical stack in a magazine, a novel and improved denester comprising:
   A. at least two opposed, vertically arranged rotary denester members;
   B. means to synchronously rotate said members;
   C. each denester member comprising a vertical member having mounted thereon;
      (1) a horizontally oriented lower plate member which extends laterally to underlie and support the bottom of the lowermost of said stacked trays during rotation of said denester member about its vertical axis
      (2) a horizontally oriented upper plate member that is vertically spaced from said lower plate, having a radius smaller than that of the lower plate, wherein said upper plate member extends laterally to underlie and support flanges of a next succeeding tray to a tray in the process of being denested during rotation of said denester member; and
      (3) an inclined, planar cam plate that extends laterally outwards from the vertical member of said denester below the upper plate, extends downwardly to below and is free of the lower plate member, and extends sufficiently laterally outwards of said body whereby to contact a flange of a tray being denested; whereby
   D. on rotation of said at least two denester members the lower plates will first underlie and support a said lowermost tray, then pass out of supporting position while generally coincident therewith the upper plates will commence to support at its flanges the next tray to be subsequently denested and still coincident therewith the inclined cam plates contact the flanges of the tray in the process of being denested, and upon continued rotation of said rotary denester means said inclined cam plates continue to move said flanges whereby the tray is forcefully ejected to a receiving means disposed below said magazine.

2. Apparatus as in claim 1 further comprising means accommodating a first liner supply roll that is on stream and a second liner supply roll that is on stand by; means to firstly cut off a length of said first liner supply roll to be discarded while urging into frictional contact with such length an end portion of a movable arm, actuating motive means to move said arm in direction whereby to move such cut off length in a direction away from a tray to be lined and to release said end portion from said frictional contact and to secondly urge into frictional contact with a lead section of said stand by supply roll a second end portion of a second movable arm, actuating further motive means whereby to move said second arm in direction whereby to feed said lead section and in a direction toward a tray to be lined finally means to release said second end portion from contact with said lead section.

3. Apparatus as in claim 3, wherein each of said arms is a pivotally mounted arm whose distal end comprises said end portion and power cylinder means connect to said arms whereby to effect said frictional contact and said withdrawal and feed movements.

4. Apparatus as in claim 2, wherein said means to accommodate said first and second supply rolls comprise spindle means extending laterally of a side wall of the apparatus housing and located below the horizontal plane of tray travel.

5. Apparatus for preparing a pad liner packaging tray comprising means accommodating a first liner supply roll that is on stream and a second liner supply roll that is on stand by; means to firstly cut off a length of said first liner supply roll to be discarded while urging into frictional contact with such length an end portion of a movable arm, actuating motive means to move said arm in direction whereby to move such cut off length in a horizontal direction away from a tray to be lined and to release said end portion from said frictional contact and to secondly urge into frictional contact with a lead section of said stand by supply roll a second end portion of a second movable arm, actuating further motive means whereby to move said second arm in direction whereby to feed said lead section in a direction toward a tray to be lined and finally means to release said second end portion from contact with said lead section.

6. Apparatus as in claim 5, wherein said first and second members each comprise a pivotally mounted arm whose distal end comprises said end portion and power cylinder means connect to said arms whereby to effect said frictional contact and said withdrawal and feed movements.

* * * * *